(12) United States Patent
Zhou et al.

(10) Patent No.: US 12,478,288 B2
(45) Date of Patent: Nov. 25, 2025

(54) MINIATURIZED NONINVASIVE GLUCOSE SENSOR AND CONTINUOUS GLUCOSE MONITORING SYSTEM

(71) Applicant: Medtronic MiniMed, Inc., Northridge, CA (US)

(72) Inventors: Li Zhou, Pasadena, CA (US); Raymond M. Russell, Arcadia, CA (US); Peter Schultz, Chatsworth, CA (US)

(73) Assignee: MEDTRONIC MINIMED, INC., Northridge (CA)

( * ) Notice: Subject to any disclaimer, the term of this patent is extended or adjusted under 35 U.S.C. 154(b) by 206 days.

(21) Appl. No.: 17/734,245

(22) Filed: May 2, 2022

(65) Prior Publication Data

US 2022/0257154 A1 Aug. 18, 2022

Related U.S. Application Data

(63) Continuation of application No. 16/274,082, filed on Feb. 12, 2019, now abandoned.

(51) Int. Cl.
*A61B 5/145* (2006.01)
*A61B 5/00* (2006.01)

(52) U.S. Cl.
CPC ........ *A61B 5/14532* (2013.01); *A61B 5/0095* (2013.01); *A61B 5/7267* (2013.01); *A61B 5/746* (2013.01); *A61B 2562/0204* (2013.01)

(58) Field of Classification Search
CPC . A61B 5/14532; A61B 5/0095; A61B 5/7267; A61B 5/746; A61B 2562/0204
See application file for complete search history.

(56) References Cited

U.S. PATENT DOCUMENTS 4,691,714 A * 9/1987 Wong ................. A61B 10/0012
73/54.41
4,755,173 A 7/1988 Konopka et al.
(Continued)

FOREIGN PATENT DOCUMENTS

CN 105559794 A * 5/2016
WO 2022026062 A1 2/2022

OTHER PUBLICATIONS

Machine translation of CN105559794 A (Year: 2016).*
(Continued)

*Primary Examiner* — Justin Xu
(74) *Attorney, Agent, or Firm* — Weaver Austin Villeneuve & Sampson LLP

(57) ABSTRACT

The disclosed techniques involve a light emitter configured to emit light toward the skin of a person, a light emitter controller configured to control the light emitter to emit the light in pulses having a pulse duration and at a pulse repetition frequency, a resonance chamber positioned to receive acoustic waves generated in the person in response to the light emitted by the light emitter, a sensor configured to sense acoustic waves in the resonance chamber, and a signal processor configured to estimate a glucose concentration level in the person based on the acoustic waves sensed by the sensor. The resonance chamber is sized to form a standing wave that has an acoustic wavelength of interest when glucose analytes are present in the region of the skin of the person. The pulse duration and the pulse repetition frequency of the emitted light are set at values that support the standing wave having the acoustic wavelength of interest.

19 Claims, 13 Drawing Sheets

(56) References Cited

U.S. PATENT DOCUMENTS

| | | | |
|---|---|---|---|
| 5,391,250 A | 2/1995 | Cheney, II et al. |
| 5,485,408 A | 1/1996 | Blomquist |
| 5,522,803 A | 6/1996 | Teissen-Simony |
| 5,665,065 A | 9/1997 | Colman et al. |
| 5,800,420 A | 9/1998 | Gross et al. |
| 5,807,375 A | 9/1998 | Gross et al. |
| 5,925,021 A | 7/1999 | Castellano et al. |
| 5,954,643 A | 9/1999 | VanAntwerp et al. |
| 6,017,328 A | 1/2000 | Fischell et al. |
| 6,186,982 B1 | 2/2001 | Gross et al. |
| 6,246,992 B1 | 6/2001 | Brown |
| 6,248,067 B1 | 6/2001 | Causey, III et al. |
| 6,248,093 B1 | 6/2001 | Moberg |
| 6,355,021 B1 | 3/2002 | Nielsen et al. |
| 6,379,301 B1 | 4/2002 | Worthington et al. |
| 6,466,806 B1 | 10/2002 | Geva et al. |
| 6,544,212 B2 | 4/2003 | Galley et al. |
| 6,558,351 B1 | 5/2003 | Steil et al. |
| 6,591,876 B2 | 7/2003 | Safabash |
| 6,641,533 B2 | 11/2003 | Causey, III et al. |
| 6,736,797 B1 | 5/2004 | Larsen et al. |
| 6,749,587 B2 | 6/2004 | Flaherty |
| 6,766,183 B2 | 7/2004 | Walsh et al. |
| 6,801,420 B2 | 10/2004 | Talbot et al. |
| 6,804,544 B2 | 10/2004 | Van Antwerp et al. |
| 7,003,336 B2 | 2/2006 | Holker et al. |
| 7,029,444 B2 | 4/2006 | Shin et al. |
| 7,066,909 B1 | 6/2006 | Peter et al. |
| 7,137,964 B2 | 11/2006 | Flaherty |
| 7,303,549 B2 | 12/2007 | Flaherty et al. |
| 7,399,277 B2 | 7/2008 | Saidara et al. |
| 7,442,186 B2 | 10/2008 | Blomquist |
| 7,602,310 B2 | 10/2009 | Mann et al. |
| 7,647,237 B2 | 1/2010 | Malave et al. |
| 7,699,807 B2 | 4/2010 | Faust et al. |
| 7,727,148 B2 | 6/2010 | Talbot et al. |
| 7,785,313 B2 | 8/2010 | Mastrototaro |
| 7,806,886 B2 | 10/2010 | Kanderian, Jr. et al. |
| 7,819,843 B2 | 10/2010 | Mann et al. |
| 7,828,764 B2 | 11/2010 | Moberg et al. |
| 7,879,010 B2 | 2/2011 | Hunn et al. |
| 7,890,295 B2 | 2/2011 | Shin et al. |
| 7,892,206 B2 | 2/2011 | Moberg et al. |
| 7,892,748 B2 | 2/2011 | Norrild et al. |
| 7,901,394 B2 | 3/2011 | Ireland et al. |
| 7,942,844 B2 | 5/2011 | Moberg et al. |
| 7,946,985 B2 | 5/2011 | Mastrototaro et al. |
| 7,955,305 B2 | 6/2011 | Moberg et al. |
| 7,963,954 B2 | 6/2011 | Kavazov |
| 7,977,112 B2 | 7/2011 | Burke et al. |
| 7,979,259 B2 | 7/2011 | Brown |
| 7,985,330 B2 | 7/2011 | Wang et al. |
| 8,024,201 B2 | 9/2011 | Brown |
| 8,100,852 B2 | 1/2012 | Moberg et al. |
| 8,114,268 B2 | 2/2012 | Wang et al. |
| 8,114,269 B2 | 2/2012 | Cooper et al. |
| 8,137,314 B2 | 3/2012 | Mounce et al. |
| 8,181,849 B2 | 5/2012 | Bazargan et al. |
| 8,182,462 B2 | 5/2012 | Istoc et al. |
| 8,192,395 B2 | 6/2012 | Estes et al. |
| 8,195,265 B2 | 6/2012 | Goode, Jr. et al. |
| 8,202,250 B2 | 6/2012 | Stutz, Jr. |
| 8,207,859 B2 | 6/2012 | Enegren et al. |
| 8,226,615 B2 | 7/2012 | Bikovsky |
| 8,257,259 B2 | 9/2012 | Brauker et al. |
| 8,267,921 B2 | 9/2012 | Yodfat et al. |
| 8,275,437 B2 | 9/2012 | Brauker et al. |
| 8,277,415 B2 | 10/2012 | Mounce et al. |
| 8,292,849 B2 | 10/2012 | Bobroff et al. |
| 8,298,172 B2 | 10/2012 | Nielsen et al. |
| 8,303,572 B2 | 11/2012 | Adair et al. |
| 8,305,580 B2 | 11/2012 | Aasmul |
| 8,308,679 B2 | 11/2012 | Hanson et al. |
| 8,313,433 B2 | 11/2012 | Cohen et al. |
| 8,318,443 B2 | 11/2012 | Norrild et al. |
| 8,323,250 B2 | 12/2012 | Chong et al. |
| 8,343,092 B2 | 1/2013 | Rush et al. |
| 8,352,011 B2 | 1/2013 | Van Antwerp et al. |
| 8,353,829 B2 | 1/2013 | Say et al. |
| 11,116,448 B1 | 9/2021 | Trapero Martin et al. |
| 12,082,910 B2 | 9/2024 | Zhou et al. |
| 2003/0135100 A1 | 7/2003 | Kim et al. |
| 2004/0039271 A1 | 2/2004 | Blank et al. |
| 2007/0123819 A1 | 5/2007 | Mernoe et al. |
| 2007/0206193 A1* | 9/2007 | Pesach ............... A61B 5/0095 |
| | | 356/432 |
| 2008/0275319 A1 | 11/2008 | Van Gogh et al. |
| 2009/0079977 A1 | 3/2009 | Lipson et al. |
| 2010/0160861 A1 | 6/2010 | Causey, III et al. |
| 2010/0324398 A1 | 12/2010 | Tzyy-Ping |
| 2011/0130639 A1 | 6/2011 | Feldman |
| 2012/0271188 A1* | 10/2012 | Van Kesteren .......... G01H 5/00 |
| | | 600/532 |
| 2013/0211204 A1 | 8/2013 | Caduff et al. |
| 2013/0237802 A1 | 9/2013 | Irisawa |
| 2014/0026639 A1 | 1/2014 | Wang et al. |
| 2014/0266399 A1 | 9/2014 | Corman et al. |
| 2015/0119667 A1 | 4/2015 | Reihman et al. |
| 2015/0208924 A1* | 7/2015 | Li ....................... A61B 5/0095 |
| | | 600/407 |
| 2016/0081597 A1 | 3/2016 | Bhavaraju et al. |
| 2017/0119255 A1 | 5/2017 | Mahajan et al. |
| 2017/0128722 A1 | 5/2017 | Perez |
| 2017/0332914 A1 | 11/2017 | Chapman et al. |
| 2018/0238794 A1 | 8/2018 | Kangas et al. |
| 2019/0159705 A1 | 5/2019 | Sim et al. |
| 2019/0261900 A1 | 8/2019 | Tang et al. |
| 2020/0029870 A1 | 1/2020 | Jung et al. |
| 2020/0253513 A1 | 8/2020 | Zhou et al. |
| 2020/0352450 A1 | 11/2020 | Zhou et al. |
| 2020/0352482 A1 | 11/2020 | Gal et al. |
| 2020/0352484 A1 | 11/2020 | Zhou et al. |
| 2021/0052164 A1* | 2/2021 | Shnaiderman ..... A61B 5/02007 |

OTHER PUBLICATIONS

Geng Zhanxiao, et al., "Noninvasive Continuous Glucose Monitoring Using a Multisensor-Based Glucometer and Time Series Analysis", Scientific Reports, vol. 7, No. 1, Dec. 1, 2017, XPO55837335, DOI: 10.1038/s41598-017-13018-7, Retrieved from the Internet: <https://www.nature.com/articles/s41598-017-13018-7 .pdf>.

Jernelv, Ine L., et al., "A Review of Optical Methods for Continuous Glucose Monitoring" Applied Spectroscopy Reviews, vol. 54, No. 7, Aug. 9, 2019, pp. 543-572, XP055837301.

International Search Report and Written Opinion dated Sep. 13, 2021, in Application No. PCT/US2021/036906.

U.S. Final office Action dated Feb. 1, 2022, in U.S. Appl. No. 16/274,082.

U.S. Final Office Action dated Jan. 16, 2024 in U.S. Appl. No. 16/942,721.

U.S. Non-Final Office Action dated Dec. 8, 2023 in U.S. Appl. No. 16/942,719.

U.S. Non-Final office Action dated Jun. 28, 2021, in U.S. Appl. No. 16/274,082.

U.S. Non-Final Office Action dated Sep. 20, 2023, in U.S. Appl. No. 16/942,721.

U.S. Advisory Action dated Mar. 29, 2024 in U.S. Appl. No. 16/942,721.

U.S. Final Office Action dated May 21, 2024 in U.S. Appl. No. 16/942,719.

U.S. Notice of Allowance dated Apr. 24, 2024 in U.S. Appl. No. 16/942,721.

JP Office Action dated Aug. 27, 2024 in JP Application No. 2023-110795 with English translation.

U.S. Advisory Action dated Aug. 2, 2024 in U.S. Appl. No. 16/942,719.

U.S. Non-Final Office Action dated Sep. 4, 2024 in U.S. Appl. No. 16/942,719.

* cited by examiner

MINIATURIZED NONINVASIVE GLUCOSE SENSOR AND CONTINUOUS GLUCOSE MONITORING SYSTEM

CROSS-REFERENCE TO RELATED APPLICATIONS

This application is a continuation of U.S. patent application Ser. No. 16/274,082, filed on Feb. 12, 2019, which is hereby incorporated by reference herein in its entirety.

TECHNICAL FIELD

Embodiments of the subject matter described herein relate generally to photoacoustic techniques for monitoring analyte concentration levels. More particularly, embodiments of the subject matter described herein relate to photoacoustic techniques for monitoring blood glucose concentration levels of a user.

BACKGROUND

There are approximately 450 million people suffering from diabetes worldwide. As is known, diabetes is a result of the body's inefficient production or use of insulin, which leads to medical complications of hyper- or hypo-glycemia in the short term, and micro- or macro-vascular problems in the long term if left untreated. The control of blood glucose concentration levels to within a desired range, for example through the administration of insulin, is therefore necessary to prevent the development of such complications.

In order to determine when blood glucose concentration levels need to be controlled, it is necessary to measure the blood-glucose concentration levels of a diabetic person.

Photoacoustic techniques for monitoring glucose concentration levels are desirable for several reasons. In particular, photoacoustic techniques do not require an invasive component, such as a transdermal sensor probe or a "finger prick" puncture, in order to monitor the glucose concentration levels of a user. Due to the non-invasive nature of photoacoustic techniques, it is possible to increase user comfort whilst wearing the device and also to improve the ease and comfort of installation of the device. Furthermore, it is possible to continuously measure the blood glucose concentration level with photoacoustic methods, in contrast to the less-useful intermittent monitoring realized by "finger-prick" monitoring techniques.

Photoacoustic techniques rely upon the irradiation of a target with light, such as light provided by a laser beam. The light produces thermal effects, such as a volumetric expansion, in the target and the thin layer of air contacting the target due to thermal diffusion, which causes a pressure oscillation that generates an acoustic wave. The characteristics of this acoustic wave depend upon several factors, such as the target's absorption co-efficient to the wavelength of light used, the density of the medium through which the acoustic wave propagates, the thermal expansion co-efficient of the target, the velocity of the acoustic wave, and so on.

If skin is used as a target, the light may penetrate a distance into the skin and excite molecules, such as glucose molecules, beneath the skin. The acoustic wave generated by the thermal excitation (and subsequent volumetric expansion) of these glucose molecules can be used to estimate the concentration of the glucose molecules.

However, there are disadvantages associated with the use of photoacoustic techniques for monitoring blood glucose concentration levels. In particular, the acoustic wave generated through the excitation of glucose molecules may not be of sufficient magnitude to obtain a strong enough signal for the accurate measurement of the blood glucose concentration. Furthermore, the characteristics of the acoustic wave may vary from person to person, dependent upon (for example) the user's skin light transmittivity characteristics, skin sweat gland activity, skin composition and structure, and so on.

Accordingly, it is desirable to overcome the disadvantages associated with photoacoustic techniques for measuring analyte concentrations, such as blood glucose concentration levels. Furthermore, other desirable features and characteristics will become apparent from the subsequent detailed description and the appended claims, taken in conjunction with the accompanying drawings and the foregoing technical field and background.

BRIEF SUMMARY

Disclosed herein are techniques related to estimating glucose concentration levels in a person based on photoacoustic technology. The techniques may be practiced using a method and a glucose monitor.

In various embodiments, the techniques involve a light emitter configured to emit light toward the skin of a person, a light emitter controller configured to control the light emitter to emit the light in pulses having a pulse duration and at a pulse repetition frequency, a resonance chamber positioned to receive acoustic waves generated in the person in response to the light emitted by the light emitter, a sensor configured to sense acoustic waves in the resonance chamber, and a signal processor configured to estimate a glucose concentration level in the person based on the acoustic waves sensed by the sensor. The resonance chamber is sized to form a standing wave that has an acoustic wavelength of interest when glucose analytes are present in the region of the skin of the person. The pulse duration and the pulse repetition frequency of the emitted light are set at values that support the standing wave having the acoustic wavelength of interest.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
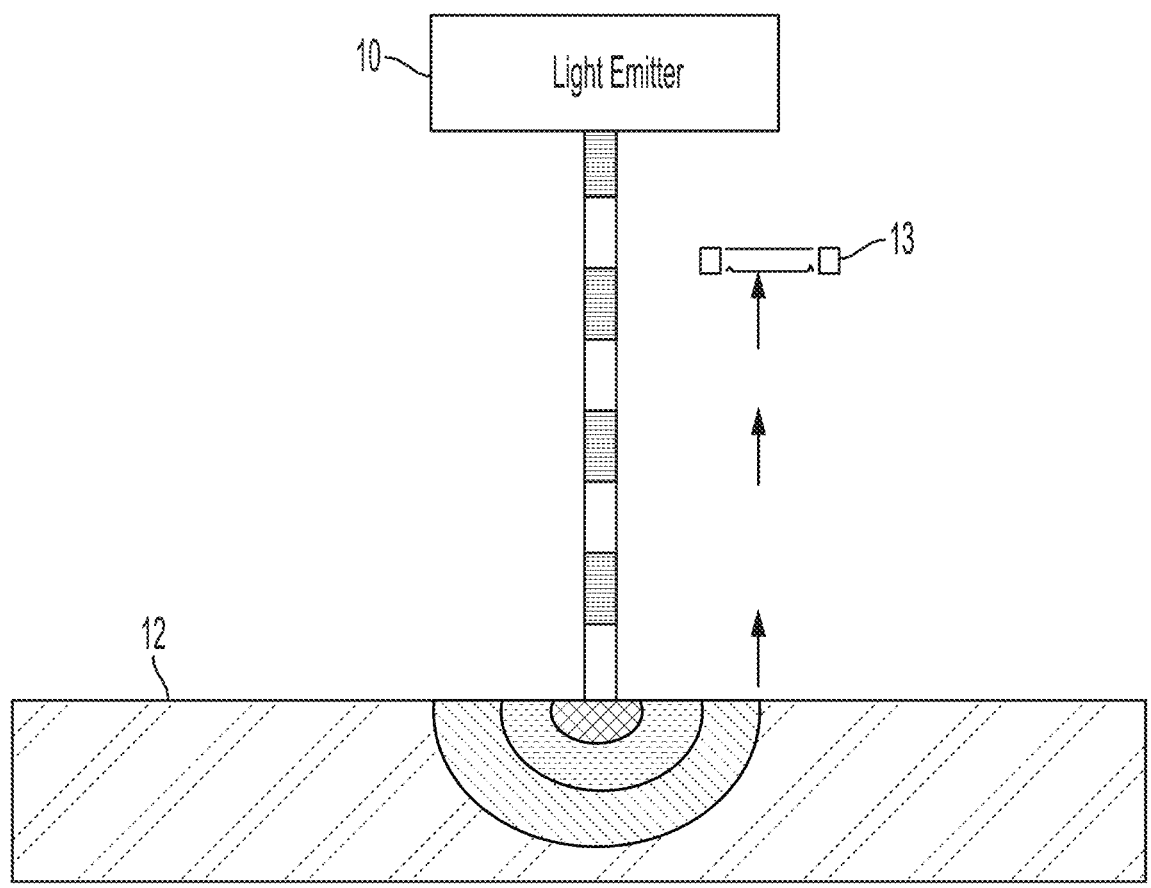
FIG. 1 shows a schematic of a photoacoustic technique for measuring an analyte concentration of a target.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

"Connected/Coupled"—The following description refers to elements or features being "connected" or "coupled" together. As used herein, unless expressly stated otherwise, "coupled" or "connected" means that one element/feature is directly or indirectly joined to (or directly or indirectly communicates with) another element/feature, and not necessarily mechanically.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

It should be appreciated that the later-described digital signal processor, and any corresponding logical elements, individually or in combination, are exemplary means for performing a claimed function.

FIG. 1 shows a schematic illustrating how photoacoustic measurement techniques may be used to obtain a sensor signal representative of an analyte concentration, for example a blood glucose concentration level of a user. As can be seen in FIG. 1, a light emitter 10 is configured to emit light towards a target 12, which may be tissue of a user, for example skin. The light incident on the target 12 penetrates a distance into the target 12 and interacts with analyte molecules, for example glucose molecules, present in the target 12. The analyte molecules are thermally excited and vibrate, and the medium surrounding these molecules undergoes a volumetric expansion, thereby generating an acoustic wave. This acoustic wave propagates out of the target 12 and into the medium surrounding the target, for example air. The propagation of the acoustic wave is illustrated in FIG. 1 through the use of bold arrows. The acoustic wave is then detected by a sensor 13 configured to convert the pressure of the acoustic wave into an electrical signal. In an exemplary embodiment, the sensor 13 comprises a microphone. In an alternative exemplary embodiment, the sensor 13 comprises a transducer, for example a piezoelectric transducer.

Figure 2:
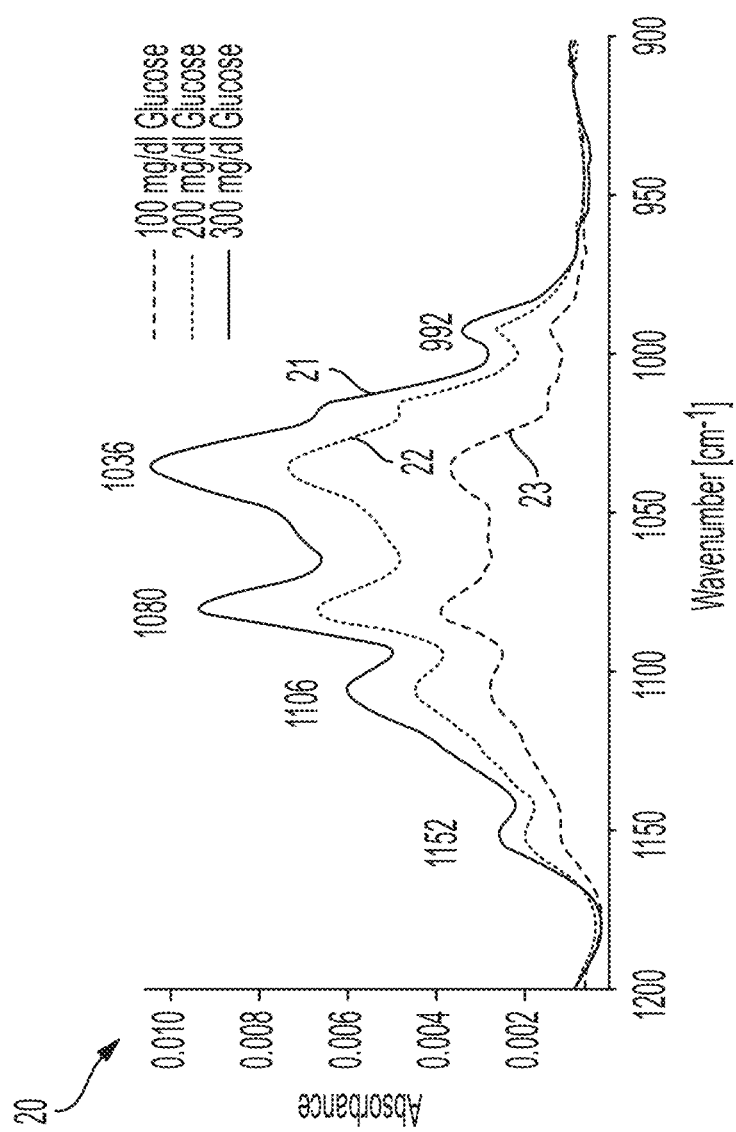
FIG. 2 shows a graph of wavelengths of light that strongly interact with glucose molecules.

In an exemplary embodiment, the wavelength of the light emitted by the light emitter 10 is selected so as to strongly interact with the analyte of interest. As can be seen in the graph 20 shown in FIG. 2, if the analyte of interest is glucose, the wavelength of the light emitted by the light emitter can be selected to correspond to wavelengths which interact strongly with glucose molecules for thermal excitation of the glucose molecules. The graph 20 of FIG. 2 shows that wavenumbers (the reciprocal of wavelength) of between about 1150 and 1000 interact strongly with glucose molecules. This range of wavenumbers corresponds to wavelengths of light in the mid-infrared region.

As can also be seen in FIG. 2, the absorbance of light by glucose molecules in this wavenumber region generally increases as the glucose concentration level increases. The three spectra 21, 22 and 23 shown in the graph 20 relate to the absorbance of light at blood glucose concentration levels of 300 mg/dl, 200 mg/dl and 100 mg/dl, respectively.

In general, the higher the level of absorbance of light by the analyte, the greater the acoustic response signal that will be generated by that analyte. As such, the magnitude of the acoustic response signal after irradiation of the target with light can be correlated to the analyte concentration level.

The present inventors recognized that at certain analyte concentration levels, the magnitude of the acoustic response is not large enough to accurately distinguish between differences in analyte concentrations without the use of highly-sensitive, expensive sensors. These types of highly-sensitive sensor may be prohibitively expensive when attempting to commercialize an analyte monitor based on photoacoustic techniques.

In order to circumvent the need for these kinds of expensive sensors to accurately detect the magnitude of the acoustic response from the target, the inventors recognized that the acoustic signal response may be improved through the use of a resonance chamber. A resonance chamber uses the physical principle of resonance to enhance the acoustic response. More specifically, when an acoustic wave enters the resonance chamber, the acoustic wave reflects back and forth within the chamber with minimal energy loss so as to form a standing wave. As additional acoustic waves enter the resonance chamber, the intensity of the standing wave increases.

As such, by pulsing the light emitted from the light emitter 10 and then measuring the intensity of the acoustic standing wave formed in reaction to these light pulses, it is possible to more accurately correlate the acoustic response to an analyte concentration value for a given quality of sensor.

The inventors additionally found that, through the use of a resonance chamber, a certain amount of noise-filtering of the acoustic response was achievable. More specifically, since the resonance chamber is sized so as to form a standing wave with acoustic waves having a specific wavelength of interest, "noise" (acoustic waves of different wavelengths/frequencies) are not amplified by the standing wave in the same manner as the acoustic waves having the wavelength of interest. As such, the resonance chamber not only amplifies the wavelengths of the acoustic waves of interest, but also advantageously acts as a mechanical bandwidth-filter for the acoustic waves of the acoustic response.

Figure 3:
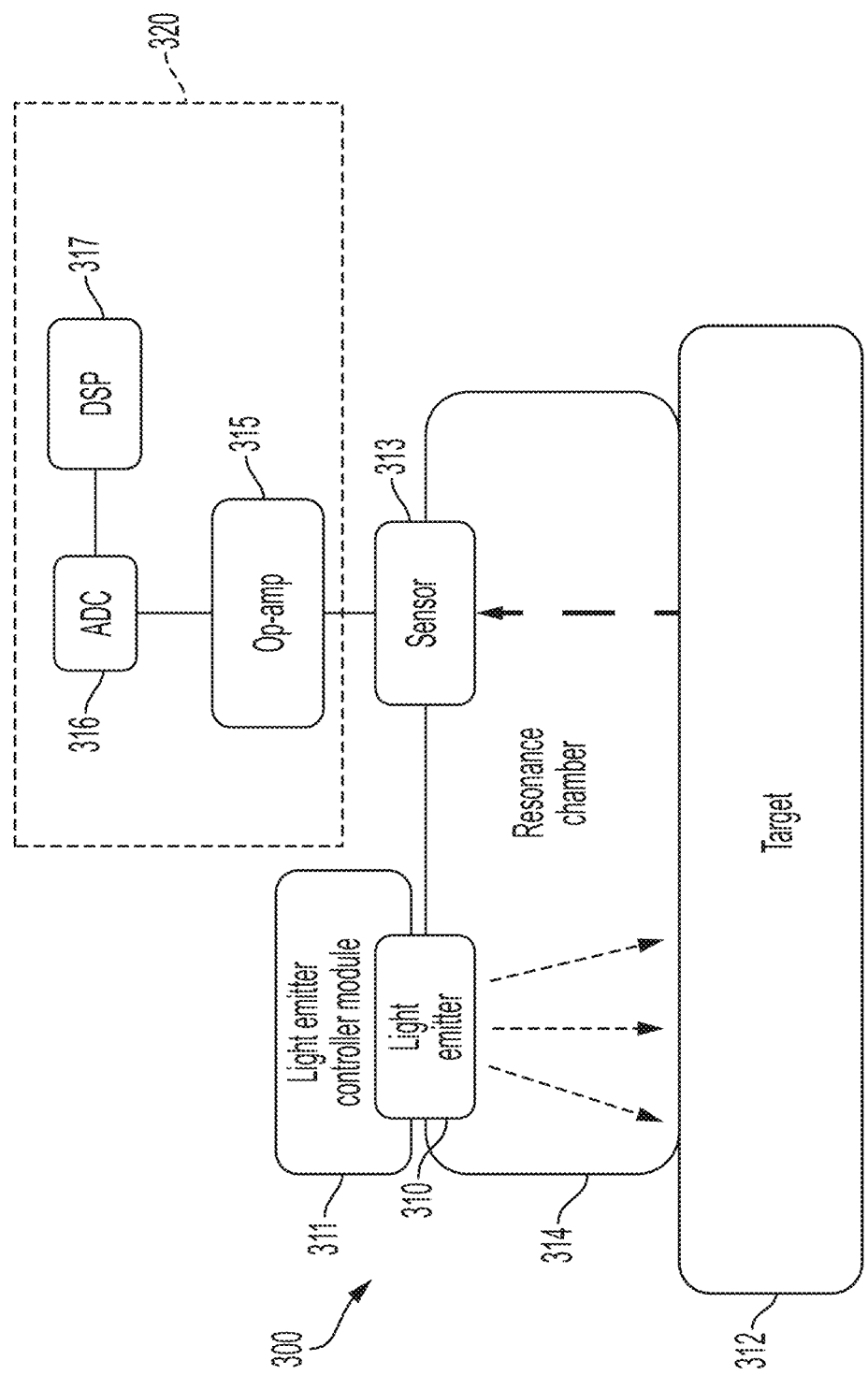
FIG. 3 shows a schematic of an analyte monitor in accordance with exemplary embodiments.

A schematic analyte monitor 300 in accordance with an exemplary embodiment is shown in FIG. 3. As can be seen in FIG. 3, the analyte monitor 300 includes a light emitter 310 for emitting light shown with thin dashed lines) towards a target 312. In an exemplary embodiment, the light emitter 310 comprises a light-emitting diode (LED). In an alternative embodiment, the light emitter 310 comprises a laser chip. A light emitter controller module 311 includes circuitry associated with the lighter emitter 310. In exemplary embodiments, the light emitter controller module 311 is configured to control the light emitter 10 such that the pulses of light emitted by the light emitter 10 have a pre-determined or a variable pulse repetition frequency (PRF). In other words, the light emitter controller module 311 is suitable for modulating the frequency of the light pulses emitted by the light emitter 310. Preferably, the light emitter controller module 311 is configured to control the light emitter 310 so as to emit light pulses having a duration of about 500 ns per pulse at a frequency of about 50 kHz or more. This pulse duration and frequency has been found to achieve a good acoustic response for certain analytes of interest, such as glucose.

In an embodiment, the light emitter 310 may include a heat conduction element (not shown) configured to conduct heat away from the light emitter 310 so as to reduce the likelihood that the light emitter 310 is heated to an undesirable temperature. In an additional or alternative embodiment, the light emitter 310 may include an anti-reflection surface (not shown) to reduce acoustic signal response noise caused by reflections of the emitted light.

The analyte monitor 300 further includes a sensor 313, for example a microphone or a transducer, such as a piezoelectric transducer. The sensor 313 is configured to detect acoustic waves (shown with a bold dashed line) emitted from the thermal excitation of analyte molecules and volumetric expansion in the target 312 by the light emitted from the light emitter 310 and generate an electrical signal based on these acoustic waves.

The analyte monitor 300 further includes a resonance chamber 314. The resonance chamber 314 is sized and dimensioned so as to form a standing wave for acoustic waves having a wavelength corresponding to the wavelength of acoustic waves generated through the volumetric expansion of the analyte-containing medium of interest after irradiation with light, which is controlled by pulse repetition frequency (PRF). For example, if the analyte of interest was glucose, and the wavelength of the acoustic wave generated through the irradiation of glucose with light at the pulse repetition frequency around 55 KHz was on the order of about 6 mm, then the resonance chamber would be sized and dimensioned to as to support a standing wave having a length on the order of 6 mm. In an embodiment, the resonance chamber has a length that is a scalar multiple of the length of the acoustic wave generated through the thermal excitation and subsequent volumetric expansion of a glucose molecule, for example 6 mm, 12 mm, 18 mm, and so on. It will be appreciated that if the standing wave were to have a different wavelength, the dimensions of the resonance chamber may be changed accordingly. Although the embodiment in FIG. 3 shows the light emitter being inside the resonance chamber, in various embodiments the light emitter is located outside of the resonance chamber.

The present inventors found that, through the use of such a resonance chamber, acoustic wave amplification of up to about three times can be achieved, in comparison to the base acoustic signal. Furthermore, as explained above, the resonance chamber may perform a noise-filtering function.

In exemplary embodiments, the sensor 313 is operably connected to a signal processing module 320. In the embodiment shown in FIG. 3, the signal processing module 320 includes an operational amplifier ("op-amp") 315 configured to further amplify the electronic signal derived from the acoustic response of the target 312. In exemplary embodiments, the op-amp 315 is operably connected to an analog-to-digital converter 316 configured to convert the analog electrical signal from the sensor 313 to a digital signal. In exemplary embodiments, the analog-to-digital converter 316 is operably connected to a digital signal processor ("DSP") 317 for processing of the digital signal.

Converting the analog signal from the sensor 313 into a digital signal allows for the accurate separation of different magnitudes of acoustic response into "bins" corresponding to different glucose concentration levels, these "bins" being separated by pre-determined threshold values. For example, an acoustic response of a first magnitude or less could be determined to correlate to a glucose concentration level of about 100 mg/dl or below, which could be determined by the signal processing module 320 as corresponding to a "hypoglycemic" glucose level. An acoustic response having a magnitude between the first magnitude and a second magnitude could be determined to correlate to a glucose concentration of between about 100 mg/dl and about 200 mg/dl, which could be determined by the signal processing module 320 as corresponding to a "normal" glucose level. Still further, an acoustic response having a magnitude greater than the second magnitude could be determined to correlate to a glucose concentration of over about 200 mg/dl, which could be determined by the signal processing module 320 as corresponding to a "hyperglycemic" glucose level.

As will later be explained in more detail with respect to FIG. 11 in an embodiment, upon determination of a "hypoglycemic" or "hyperglycemic" glucose level, the signal processing module 320 is configured to transmit a warning signal to the user of the analyte monitor, or to take some other form of action (such as automatically activating an insulin pump).

Furthermore, by "binning" the acoustic responses using pre-determined thresholds, a more computationally efficient and accurate monitoring of glucose concentration level results. In particular, by comparing the magnitude of the acoustic response to pre-determined thresholds, hypoglycemic and hyperglycemic events may be detected more quickly and more accurately by the signal processing module 320.

Figure 4:
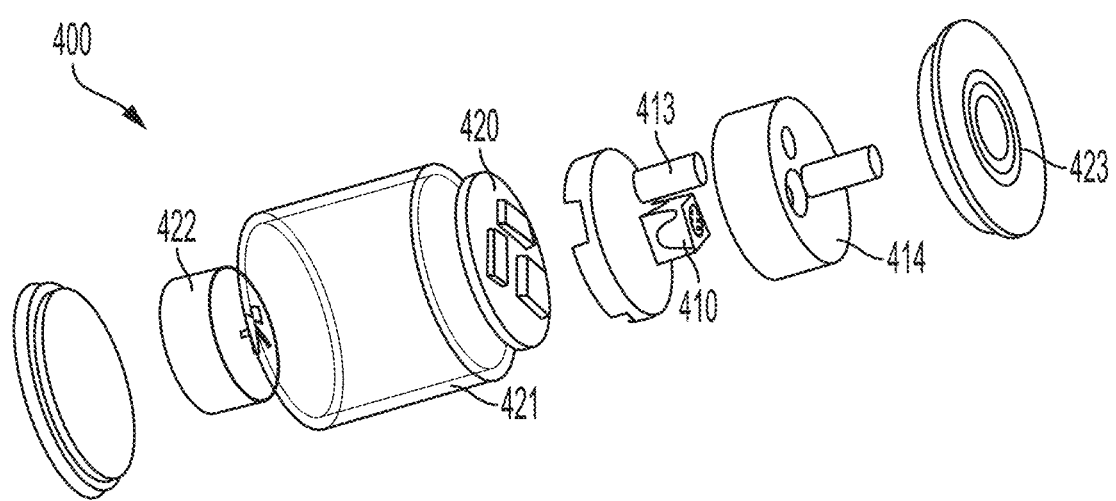
FIG. 4 shows an exploded view of an analyte monitor in accordance with exemplary embodiments.

Turning to FIG. 4, an exploded-view diagram of an analyte monitor 400 in accordance with an embodiment is shown. The analyte monitor 400 includes a light emitter 410 configured to emit light of a pre-determined wavelength. The analyte monitor 400 further includes a sensor 413 configured to detect acoustic waves generated from the volumetric expansion of an analyte of interest after irradiation of that analyte of interest with light generated by the light emitter 410. The analyte monitor 400 further includes a resonance chamber 414 sized and configured to form a standing wave from the acoustic waves so as to amplify the magnitude of the acoustic waves. The analyte monitor 400 further includes a signal processing module 420 configured to estimate an analyte concentration level based on the magnitude of the sensed acoustic response.

In exemplary embodiments, the analyte monitor 400 further includes a power source 422 configured to supply power to one or more of the light emitter 410, the sensor 413 and the signal processing module 420, or other components of the analyte monitor 400.

In exemplary embodiments, the analyte monitor 400 further includes a case 421 configured to surround one or more of the above-described components. In exemplary embodiments, the case 421 may comprise a case cover having a transmitter 423 incorporated into the case cover. In other exemplary embodiments, the transmitter 423 is located elsewhere in the analyte monitor, for example proximate to the signal processing module 420. Incorporation of the transmitter 423 into the case cover allows for the transmitter 423 to have a larger size than if the transmitter 423 were to be located inside the case 421 of the analyte monitor 400 and also to reduce the overall size of the analyte monitor. For example, in instances where the transmitter 423 comprises an antenna (for example a RF antenna), the increased size of the transmitter 423 allows for a more powerful signal to be generated by the transmitter 423.

The transmitter 423 is operably connected to the signal processing module 420. When a measured analyte concentration is determined to be outside of a "normal" range, the transmitter 423 is configured to transmit a signal responsive to this determination. For example, in an embodiment, the transmitter 423 is configured to transmit a signal to a remote device (not shown), such as a smartphone or smartwatch, in order to warn the user of the analyte device of the high or low analyte concentration level. Additionally or alternatively, the transmitter 423 is configured to transmit a signal to a remote device (not shown) for application of an additional substance to the user of the analyte monitoring device, such as an insulin pump for delivering insulin to the patient.

Figure 5:
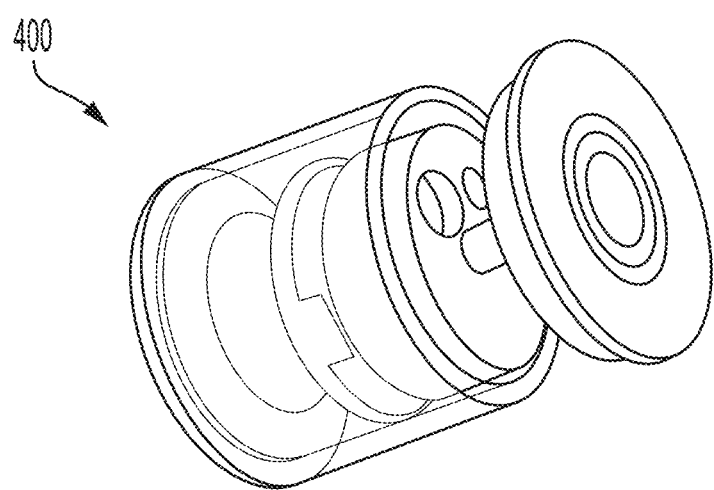
FIG. 5 shows an angled partially transparent perspective view of an analyte monitor in accordance with exemplary embodiments.

FIG. 5 shows an angled phantom view of a partially-assembled analyte monitor 400. As can be seen in FIG. 5, the assembled analyte monitor 400 may have a length of around below about 50 mm, for example below about 40 mm, such as below about 30 mm, preferably below about 20 mm, most preferably about 15 mm. The assembled analyte monitor 400 may have a width of below about 50 mm, for example below about 40 mm, such as below about 30 mm, preferably below about 20 mm, most preferably about 18 mm. As such, the assembled analyte monitor 400 may be worn discretely by a user, or even incorporated into jewelry or clothing of the user, for example incorporated into an earring, a watch or a bracelet.

Figure 6:
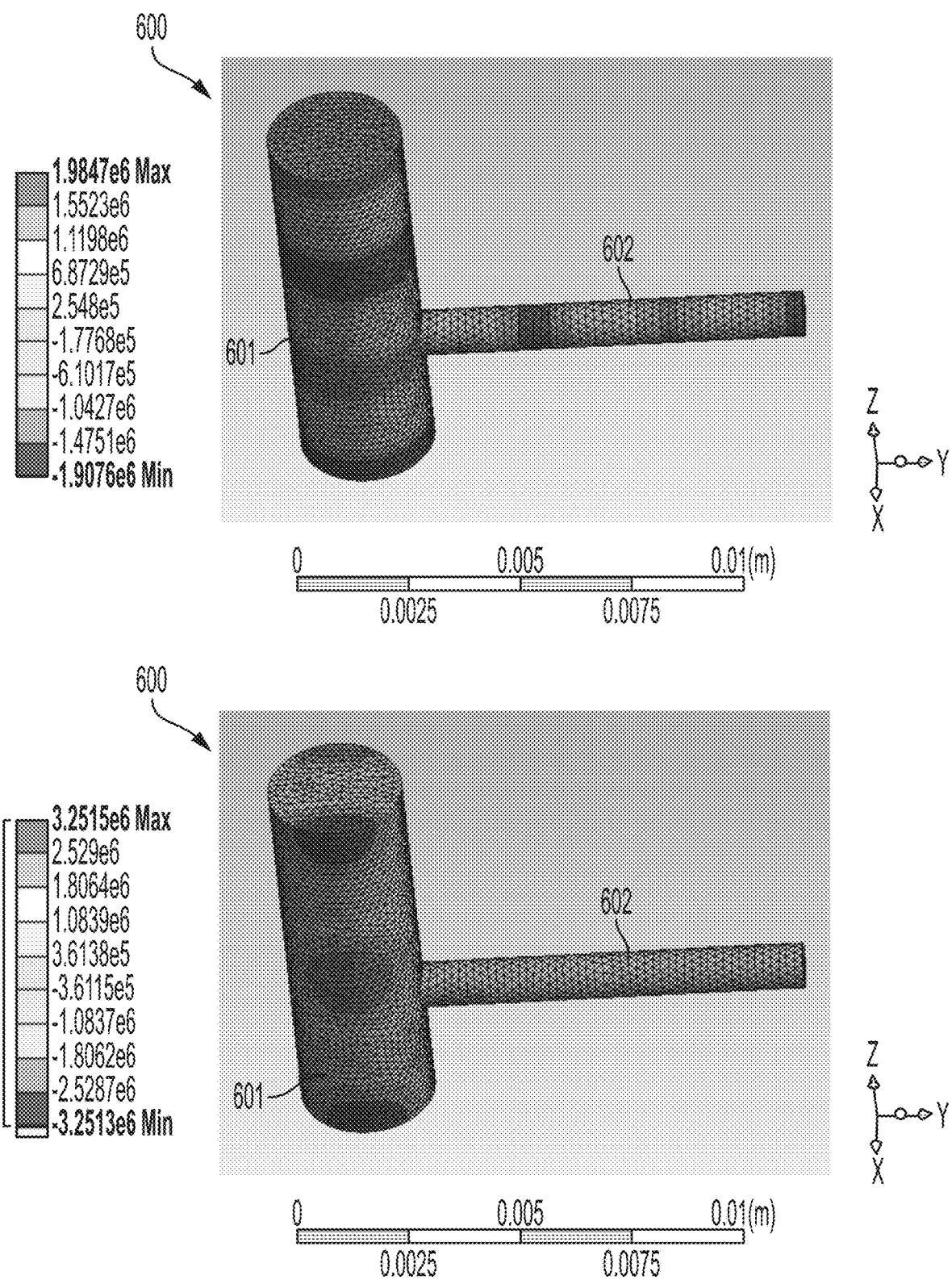
FIG. 6 shows computer simulations of a resonance chamber in accordance with exemplary embodiments.

Another view of a resonance chamber in accordance with exemplary embodiments is shown in FIG. 6. In FIG. 6, two computer models of a resonance chamber 600 are shown. The resonance chamber 600 includes a resonance branch 601 and a measurement branch 602. The resonance branch 601 is sized and dimensioned so as to form a standing wave, in the manner as described above. The measurement branch 602 connects the resonance branch 601 to the sensor.

As can be seen in the two figures of FIG. 6, the length of the resonance branch 601 and the placement of the measurement branch 602 along the resonance branch are important for obtaining a clear signal of the acoustic response. In particular, as can be seen in the bottom figure of FIG. 6, the measurement branch 602 is positioned adjacent to a node of the standing wave formed in the resonance branch 601. As such, minimal propagation of the acoustic wave down the measurement branch 602 occurs, and a lower magnitude acoustic response is measured by the sensor. Further, as can be seen in the top figure of FIG. 6, the measurement branch 602 is positioned close to an antinode of the standing wave formed in the resonance branch 601. As such, a good propagation of the acoustic wave down the measurement branch 602 occurs, and an acceptable magnitude acoustic response signal is measured by the sensor. As such, in an exemplary embodiment, the measurement branch 602 is positioned proximate to an anti-node of the standing wave to be formed in the resonance chamber 601.

When developing the analyte monitor described above, the inventors recognized that the acoustic responses of each user to the light emitted from the light emitter are individual. In other words, a variety of variables may affect the acoustic response of a user, such as skin transmittivity, skin composition, sweat gland activity and so on. As such, the inventors found that a training procedure to personalize the analyte monitor to an individual user increased the accuracy of the analyte monitor in detecting raised or lowered analyte concentrations.

Figure 7:
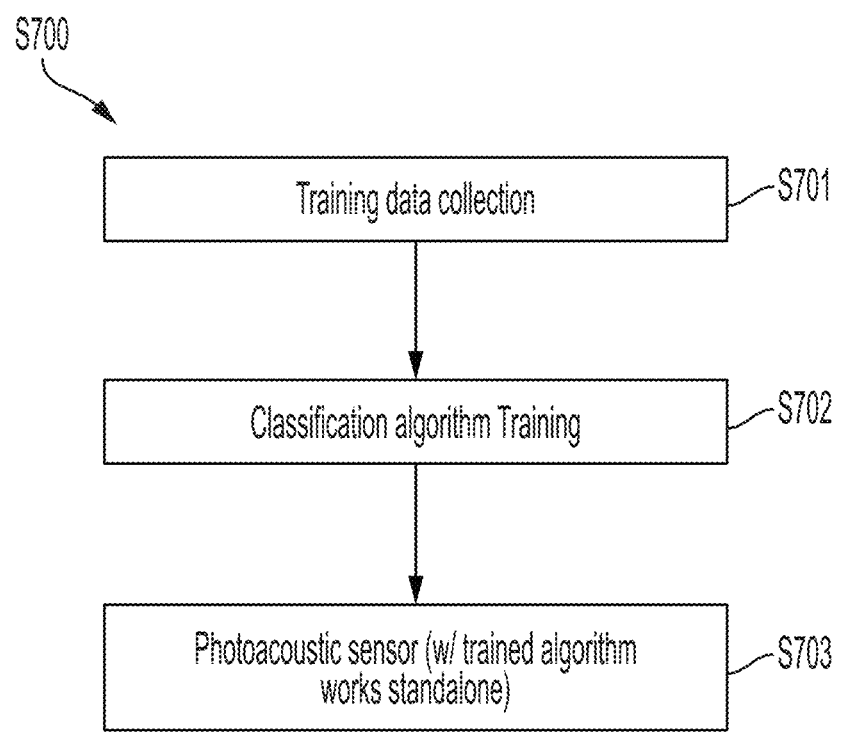
FIG. 7 shows a flowchart of a method in accordance with exemplary embodiments.

FIG. 7 shows an overview of a general method S700 for training an analyte monitor for a specific user. The individual steps of this general method will be explained in more detail with reference to FIGS. 8, 9, 10 and 11. At step S701, training data for training a signal processing module of the analyte monitor is collected from a specific user. In an embodiment, the training data is collected by obtaining analyte concentration levels of the user from a conventional analyte monitor, such as a commercially-available continuous glucose monitor having an invasive component (such as a transdermal probe), in combination with measuring acoustic responses from the analyte monitor in accordance with various embodiments as described herein. After sufficient training data has been collected from the user, the method progresses to step S702.

At step S702, the algorithm used by the signal processing module to correlate certain acoustic signal responses to the obtained analyte concentration levels is trained using the training data collected from the user. In an embodiment, the training of the signal processing module is a supervised machine learning process, where training data is first labelled and then used in training. In an embodiment, after the signal processing module is trained using the training data, the signal processing module may be tested against validation data to determine the accuracy of the signal processing module in determining analyte concentration levels. After training of the signal processing module to an acceptable accuracy, the method progresses to step S703.

At step S703, the analyte monitor has been adapted to the individual characteristics of the user and is used to monitor an analyte concentration level of the use without the concurrent use of another analyte monitor.

Each of the steps S701, S702 and S703 of the method S700 will now be described in more detail.

Figure 8:
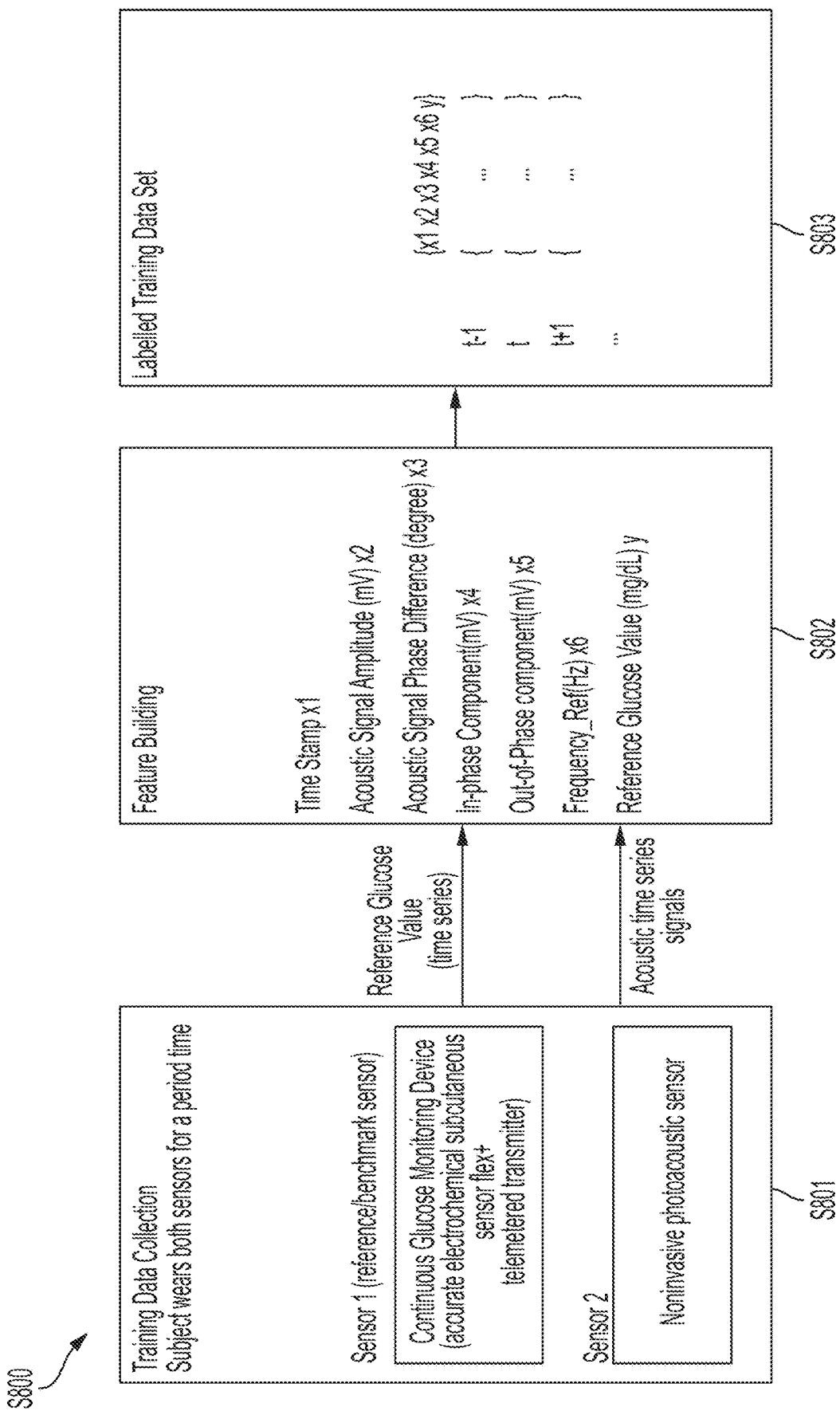
FIG. 8 shows a flowchart of another method in accordance with exemplary embodiments.

FIG. 8 shows a more detailed flowchart S800 illustrating exemplary steps involved in the collection of a training data set of step S701. At Step S801, data is collected from a specific user via two or more analyte monitors. One of these analyte monitors is an analyte monitor in accordance with exemplary embodiments as described herein, and at least one other of these analyte monitors comprises a conventional analyte monitor, such as a continuous glucose monitor comprising a transdermal probe. The conventional analyte monitor collects data related to the user's blood analyte concentration levels to be used as reference data. The analyte monitor in accordance with various embodiments obtains acoustic responses in parallel with obtaining the reference data.

As the reference data is obtained in parallel with the acoustic responses, it is possible to correlate features of the acoustic responses to the reference data. In Step S802, features (x1, x2, x3, x4, x5 and x6) of the acoustic response signals detected by the sensor of the analyte monitor in accordance with exemplary embodiments are associated with the simultaneously-obtained analyte reference values (y) obtained by the conventional analyte monitor.

For example, if the analyte of interest is glucose, reference glucose concentration values (y) obtained from the conventional analyte sensor can be associated with the time stamp (x1), amplitude (x2), phase difference (x3), in-phase component (x4), out-of-phase component (x5) and frequency (x6) of the acoustic signal response obtained via the analyte monitor in accordance with exemplary embodiments. It is to be noted that the above list of features is not an exhaustive list, and other features of the acoustic signal response may additionally or alternatively be associated with the reference glucose concentration values (y) obtained from the conventional analyte monitor.

After association of the features (x1, x2, x3, x4, x5 and x6) of the acoustic response to the reference data (y), the method progresses to step S803, where a labelled training data set is constructed, using conventional techniques, with this data.

Figure 9:
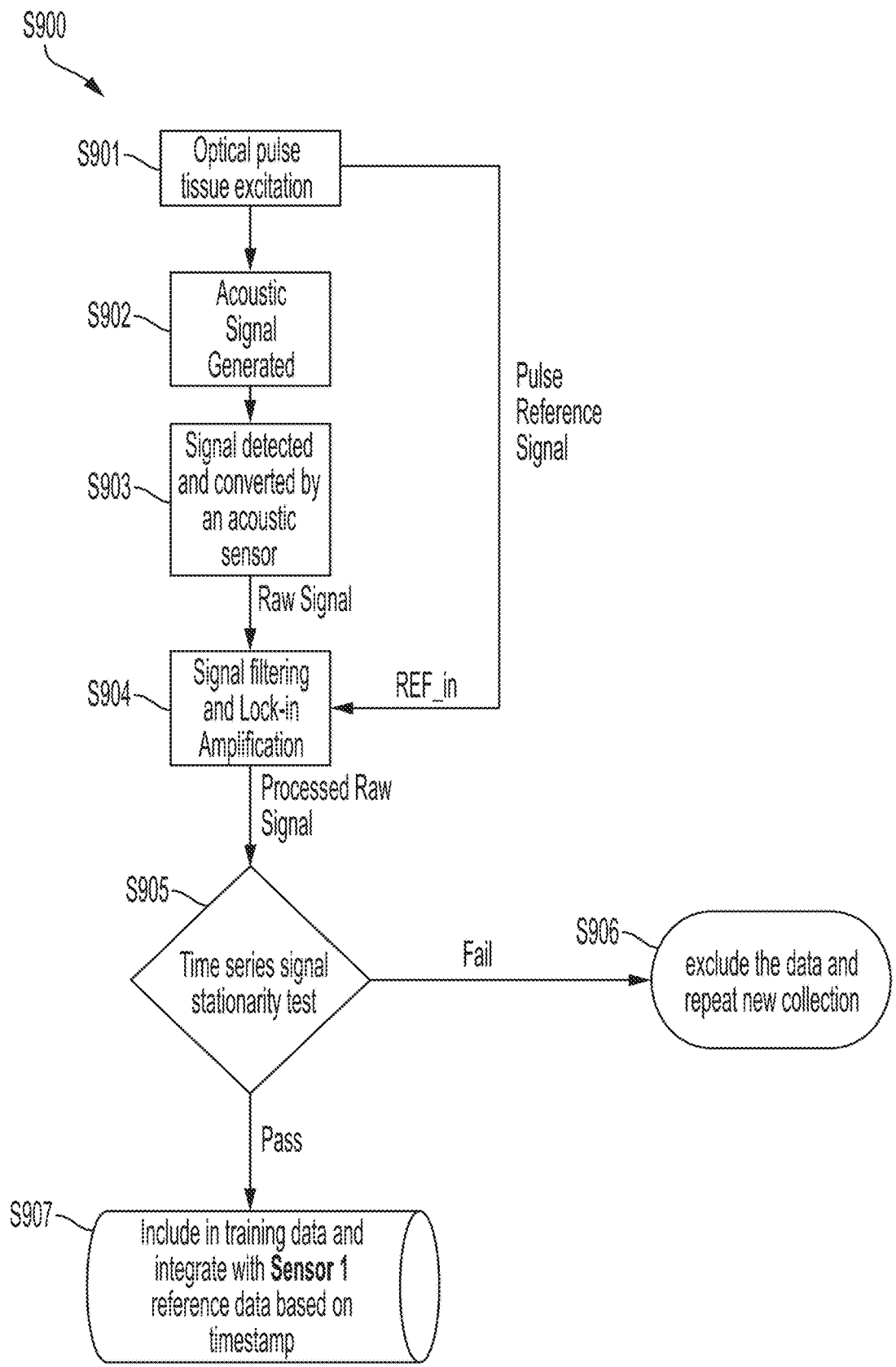
FIG. 9 shows a flowchart of another method in accordance with exemplary embodiments.

In FIG. 9, a further flowchart S900 shows how training data is collected by the analyte monitor in accordance with exemplary embodiments as described herein. At Step S901, tissue of a user is excited via an optical pulse from a light emitter. The method then progresses to step S902.

At Step S902, an acoustic signal is generated by analytes in the tissue in response to the optical pulse. At Step S903, this acoustic signal is detected by a sensor and converted into an electrical signal, in the manner described previously.

At Step S904, the electrical signal is filtered to reduce the amount of noise in the signal. In an embodiment, this filtering is achieved through the use of a bandwidth filter. In an embodiment, this filtering is achieved via a time-based filtering technique, where a pulse reference signal generated at the same time as the emission of the optical pulse in Step S901, and wherein only acoustic signals received a predetermined time after the pulse reference signal has been generated are allowed through the signal filter. Additionally or alternatively, this signal filtering may utilize timestamps associated with the pulse frequency of light to filter out noise through a comparison of the timestamps of the emitted light and the timestamps of acoustic signal responses to the light. Also at Step S904, the filtered electrical signal is amplified, for example through the use of an operational amplifier. The method then progresses to Step S905.

At Step S905, a time series stationarity test is applied to the filtered, amplified electrical signal in order to test for noise in the signal caused by, for example, contact pressure and/or motion of the user. If the signal fails this time series stationarity test, the method progresses to Step S906, where the collected data is excluded from the training data set. If the signal passes this time series stationarity test, the method progresses to Step S907, where the collected data is included in the training data set for training the analyte monitor according to various embodiments as described herein.

The method S900 is repeated until sufficient data has been collected to form a training data set large enough for training the algorithm used by the signal processing module.

Figure 10:
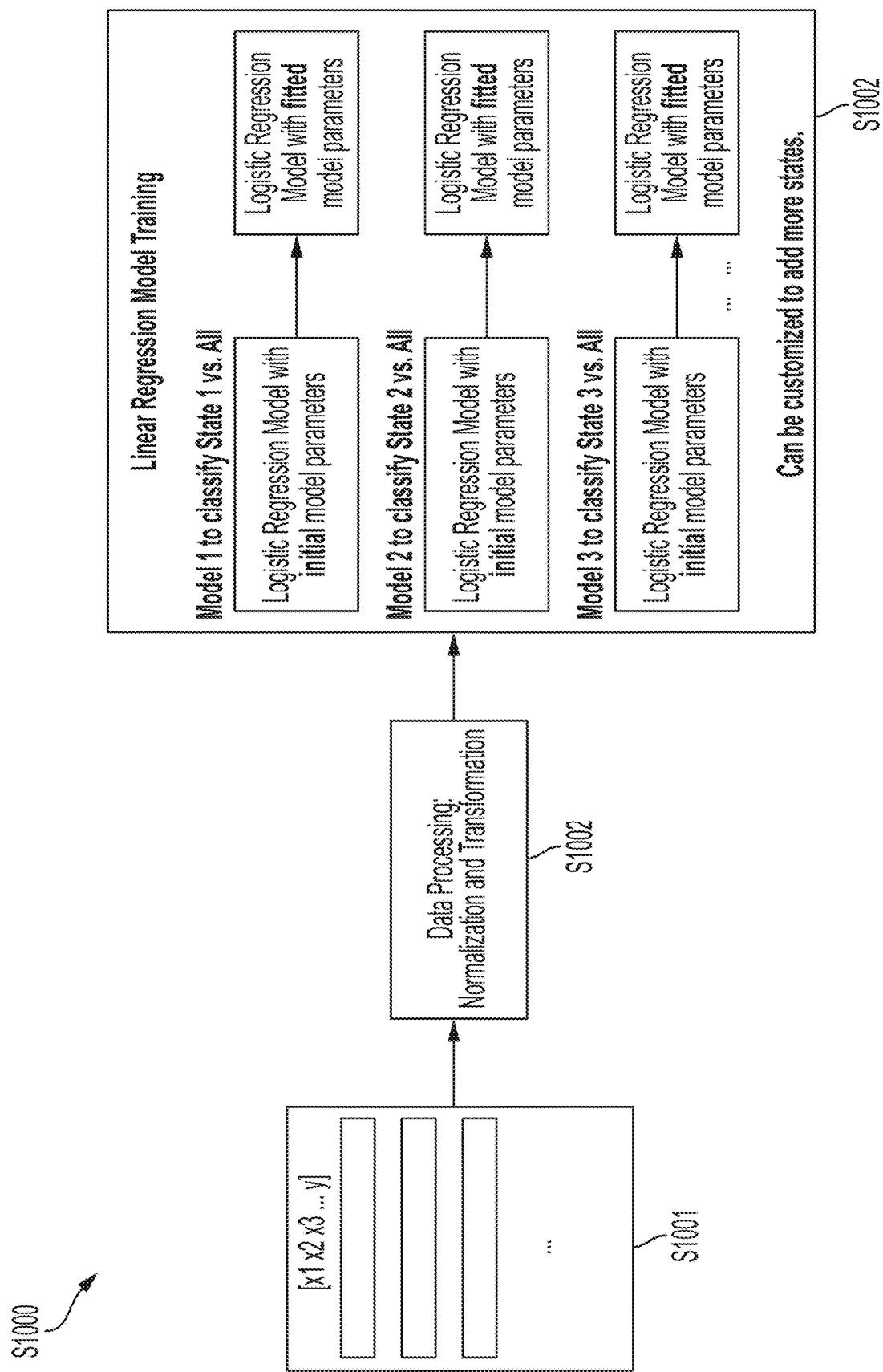
FIG. 10 shows a flowchart of another method in accordance with exemplary embodiments.

FIG. 10 shows a detailed flowchart S1000 illustrating exemplary steps involved in the training of the algorithm used in the digital signal processor as per step S702 in method S700. At Step S1001, the labelled training data set is completed. The method then progresses to Step S1002.

At Step S1002, a supervised learning method is used to train the algorithm used by the digital signal processor on the labelled training data set. More specifically, the algorithm used by the digital signal processor uses the features (x1), (x2), (x3), (x4), (x5) and (x6) of the electric signal derived from received acoustic responses and estimates a glucose concentration level based on these features. The estimated glucose concentration level is then compared to the obtained glucose concentration level (y) corresponding to those features as obtained from the conventional analyte monitor. Based on the accuracy of the comparison, parameters of the algorithm are adjusted. Statistical normalization and transformation techniques, such as linear regression techniques, may be used in this adjusting of parameters.

After the parameters have been adjusted, the glucose concentration level is again estimated and compared to the obtained glucose concentration level (y) corresponding to those features as obtained from the conventional analyte monitor. In this manner, the algorithm is iteratively trained to more accurately estimate the glucose concentration level of the user based on the features of the acoustic response signal obtained from the analyte monitor in accordance with various embodiments. When the algorithm is fully trained, a more accurate personalized calibration for a specific user is achieved. In particular, the analyte monitor according to embodiments as described herein is better able to account for variations in the skin conditions and characteristics of a specific user.

Figure 11:
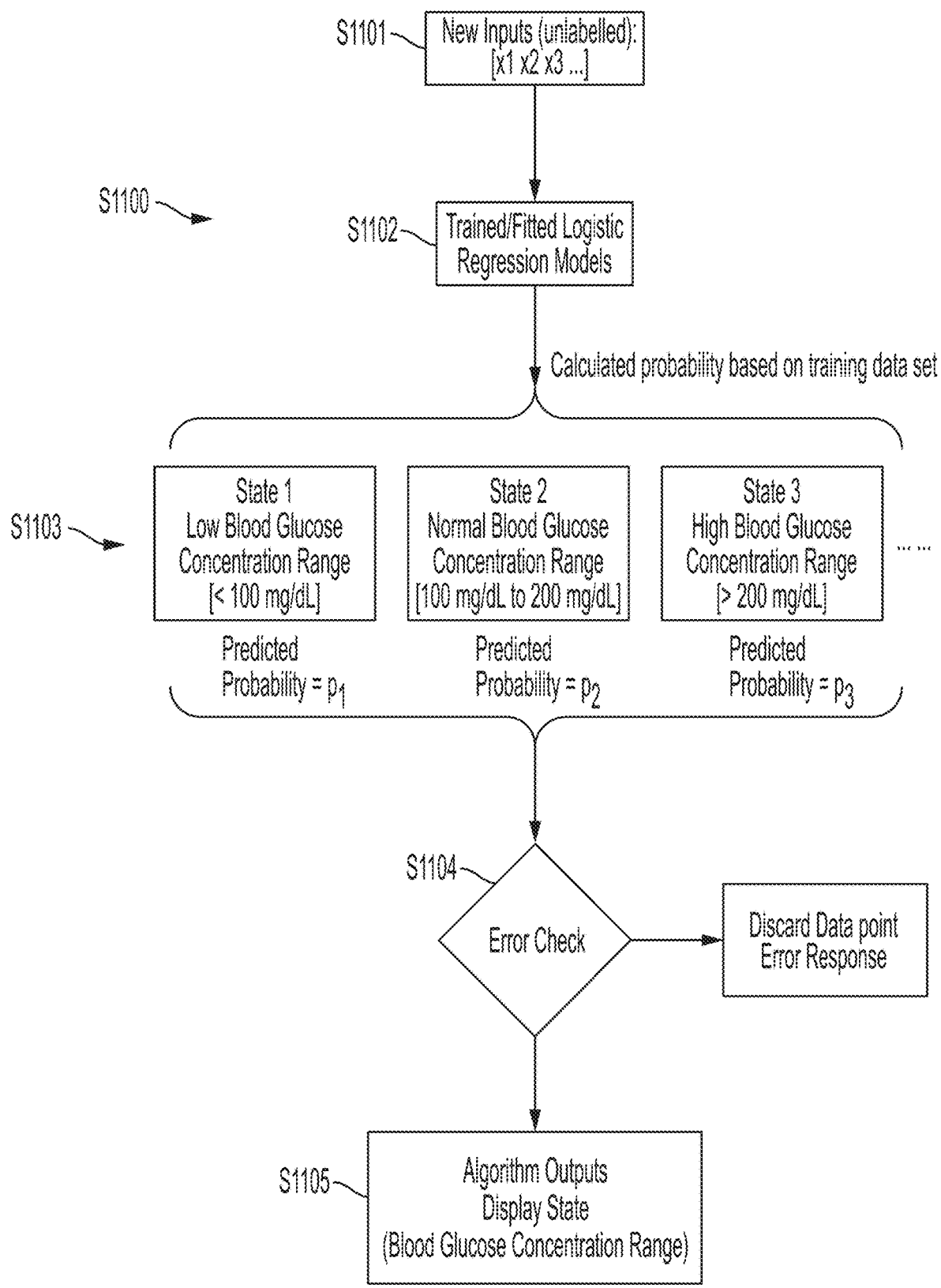
FIG. 11 shows a flowchart of another method in accordance with exemplary embodiments.

FIG. 11 shows a more detailed flowchart S1100 of the use of a trained analyte monitor in monitoring analyte concentration levels of a user, as per step S703 in FIG. 7.

At step S1101, the trained analyte monitor obtains acoustic responses that are converted into electrical signals having features (x1, x2, x3, etc.) that can be used to estimate an analyte concentration of a user. The method then progresses to step S1102.

At Step S1102, the features of the electrical signal are used, using the algorithms of the trained digital signal processor module, to estimate an analyte concentration level. After estimation of the analyte concentration level, the method progresses to step S1103.

At Step S1103, the estimated analyte concentration level is sorted into a "bin", each bin corresponding to analyte concentration levels of a particular user state. For example, the estimated analyte concentration level is a blood glucose concentration level, and the estimated glucose concentration level is sorted into one of three bins, the first bin having a range of below about 100 mg/dl and corresponding to a hypoglycemic state, the second bin having a range of between about 100 mg/dl and 200 mg/dl and corresponding to a "normal" state, and the third bin having a range of above about 200 mg/dl and corresponding to a hyperglycemic state. In an exemplary embodiment, the end-points of the ranges of the bins are variable and can be varied on the basis of a particular user's blood glucose characteristics.

In an exemplary embodiment, a probability of the estimated blood glucose level falling within a certain bin is estimated by the trained algorithm of the digital signal processor, based on the features of the electrical signal derived from the acoustic response. In this manner, a probabilistic confidence level of the "binning" step can be determined. In exemplary embodiments, multiple estimations of the blood glucose level can be performed, and the confidence level can be iteratively re-evaluated on the basis of each subsequent estimation. In this manner, a high confidence level of the binning of the blood glucose concentration estimation can be achieved.

After the analyte concentration estimation is binned, the method progresses to Step S1104. At step S1104, the algorithm of the digital signal processor outputs the "state" corresponding to the estimated analyte concentration level. For example, if the estimated blood glucose concentration level was above 200 mg/dl, the algorithm would output a "hyperglycemic" state. After outputting of this state, the method progresses to Step S1105.

At Step S1105, action is performed in response to the output of the state, if required. For example, if a "hyperglycemic" state is output by the analyte monitor, an alert may be transmitted to a remote device so as to warn the user of this state. Additionally or alternatively, a signal may be transmitted to an insulin pump so as to administer an amount of insulin in response to the output of the state. Additionally or alternatively, a signal is transmitted to a display device to display the blood glucose concentration state.

Figure 12:
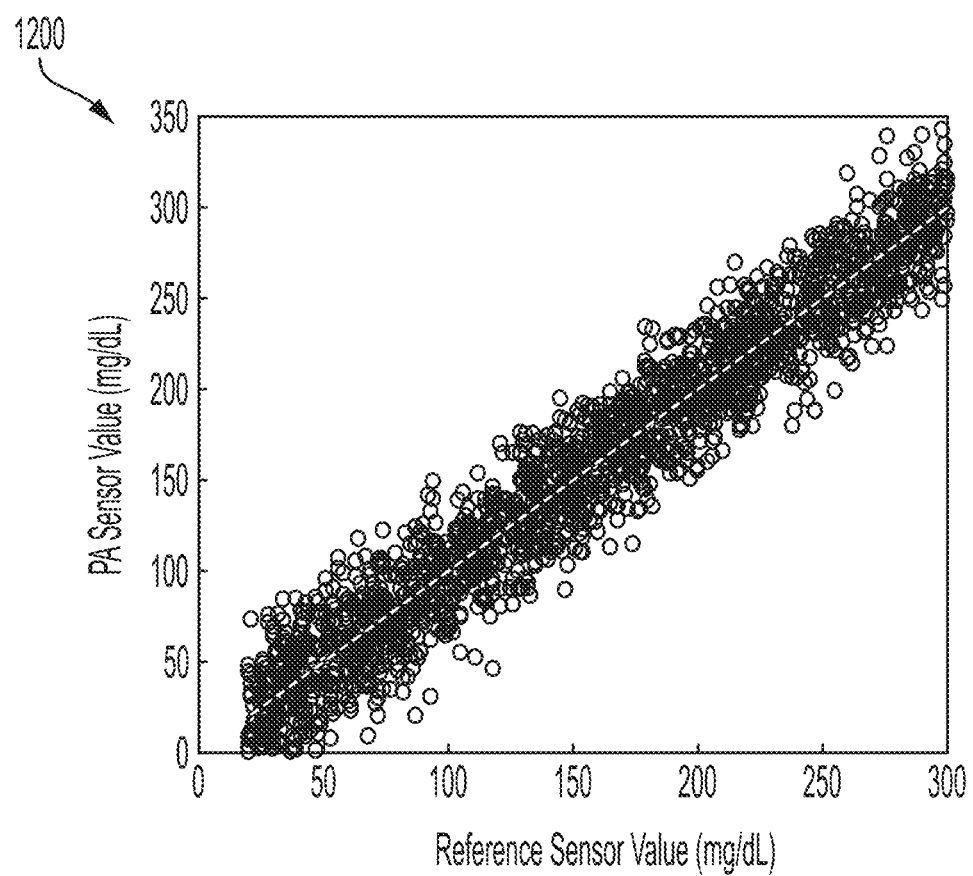
FIG. 12 shows a graph comparing results obtained from an analyte monitor in accordance with exemplary embodiments to a conventional analyte monitor.

In order to test the accuracy of glucose concentrations estimated with the analyte monitor of embodiments as described herein and a conventional continuous glucose monitor having a transdermal probe, glucose concentration measurements were tested simultaneously in-silico using a trained analyte monitor according to an embodiment and a transdermal continuous glucose monitor and then compared to each other. The results of these comparisons are shown in the graph 1200 of FIG. 12. As shown in FIG. 12, the glucose concentrations estimated by the trained analyte monitor in accordance with embodiments as described herein closely matched the glucose concentrations measured using a conventional, commercially-available continuous glucose monitor having a transdermal probe.

Glucose concentration estimations were also obtained with an in-silico simulation of untrained analyte monitor in accordance with embodiments as described herein and compared to the glucose concentrations estimations obtained with a trained algorithm prototype analyte monitor in accordance with embodiments as described herein. It was determined that the prototype untrained analyte monitor had a success rate of about 60% in determining hypoglycemic events, whereas the prototype trained analyte monitor had a success rate in excess of about 85% in determining hypoglycemic events, thereby demonstrating the effect of the machine learning training algorithm in improving the accuracy of glucose concentration estimations.

Figure 13:
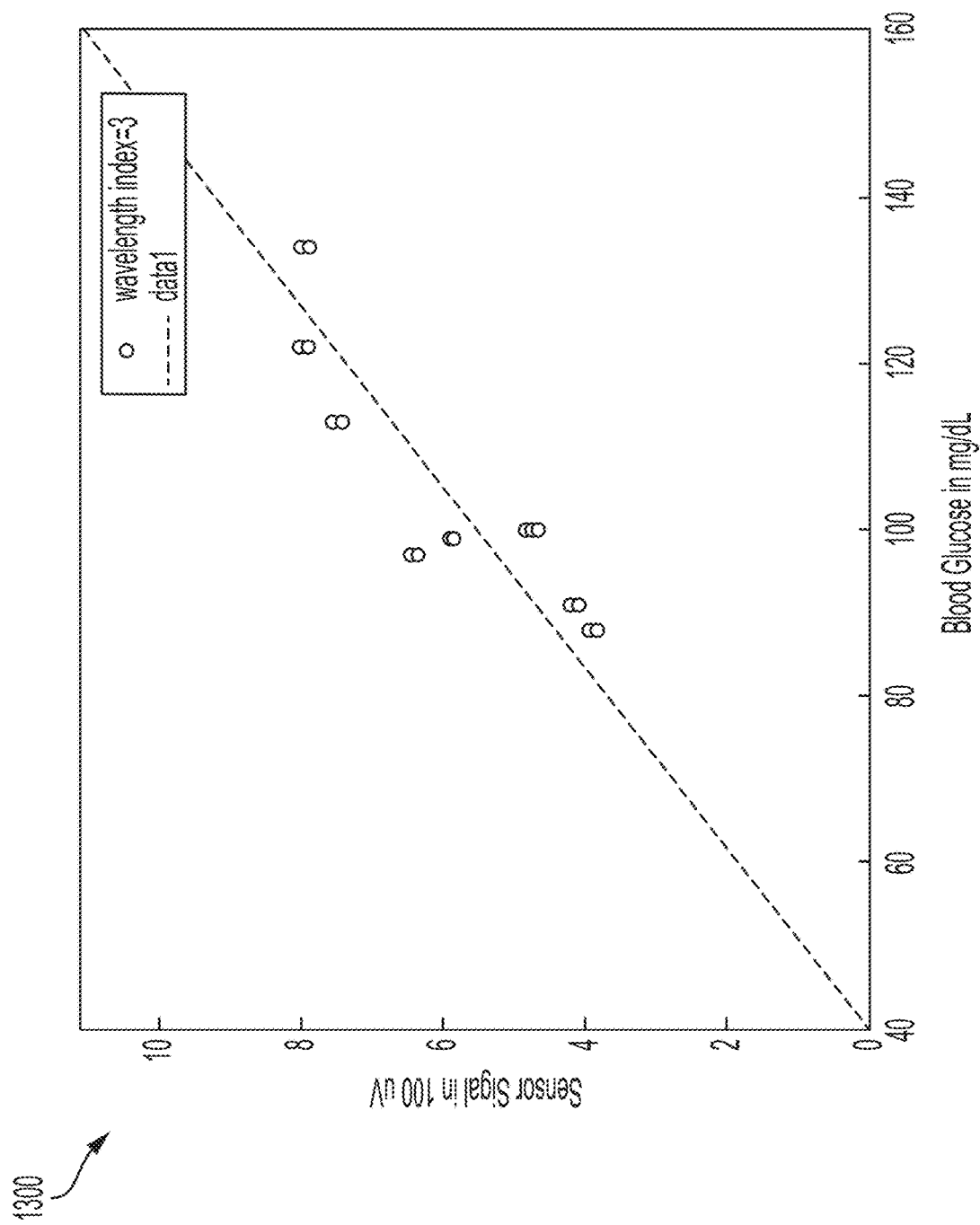
FIG. 13 shows another graph comparing results obtained from an analyte monitor in accordance with exemplary embodiments to a conventional analyte monitor.

Further, in-vivo, experiments were also performed, as shown in the graph 1300 of FIG. 13. As can be seen in FIG. 13, thee is a strong correlation between the sensor signal obtained from the analyte monitor in accordance with embodiments having a trained algorithm and a known blood glucose concentration level obtained from a reference sensor, thereby indicating the accuracy of this method in detecting blood glucose concentration levels.

The various tasks performed in connection with the processes described herein may be performed by software, hardware, firmware, or any combination thereof. For illustrative purposes, the following description of process S700 may refer to elements mentioned in connection with FIGS. 1 to 6. In practice, portions of process S700 may be performed by different elements of the described system, e.g., the digital signal processor module or a different controller module. It should be appreciated that process S700 may include any number of additional or alternative tasks, the tasks shown in FIG. 7 need not be performed in the illustrated order, and process S700 may be incorporated into a more comprehensive procedure or process having additional functionality not described in detail herein. Moreover, one or more of the tasks shown in FIG. 7 could be omitted from an embodiment of the process S700 as long as the intended overall functionality remains intact.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A glucose monitor comprising:
   a light emitter configured to emit light toward skin of a person;
   a light emitter controller configured to control the light emitter to emit the light in pulses having a pulse duration and at a pulse repetition frequency;
   a resonance chamber positioned to receive acoustic waves generated in the person in response to the light emitted by the light emitter, the resonance chamber sized to form a standing wave having an acoustic wavelength of interest, when glucose analytes are present in a region of the skin of the person;

a sensor facing the skin of the person and configured to sense acoustic waves in the resonance chamber, wherein the sensor and the light emitter are positioned side-by-side and face a same direction towards the skin of the person; and a signal processor configured to estimate a glucose concentration level in the person based on the acoustic waves sensed by the sensor, wherein the pulse duration and the pulse repetition frequency of the emitted light are set at values that support the standing wave having the acoustic wavelength of interest.

2. The glucose monitor of claim 1, wherein the light emitter is configured to emit light having a wavelength in a mid-infrared region.

3. The glucose monitor of claim 1, wherein the sensor is positioned proximate to an anti-node of the standing wave to be formed in the resonance chamber.

4. The glucose monitor of claim 1, wherein the signal processor is configured to determine whether the estimated glucose concentration level falls within one of two or more pre-determined ranges.

5. The glucose monitor of claim 4, further comprising a transmitter configured to transmit a signal when the estimated glucose concentration level falls within a particular range of the two or more pre-determined ranges.

6. The glucose monitor of claim 1, wherein the light emitter is a light emitting diode that emits diffuse light.

7. The glucose monitor of claim 1, further comprising:
a case enclosing the light emitter, the light emitter controller, the resonance chamber, the sensor, and the signal processor,
wherein the case has a length below 20 mm and a width below 20 mm.

8. The glucose monitor of claim 7, wherein the case includes a case cover having an electronic transmitter incorporated therein, the case cover configured to be positioned on the skin of the person.

9. The glucose monitor of claim 1, wherein the sensor includes a microphone or a piezoelectric transducer.

10. The glucose monitor of claim 1, wherein the light emitter and the sensor are positioned inside the resonance chamber.

11. A method for estimating a glucose concentration level in a person, the method comprising:

emitting light from a light emitter toward skin of the person;

controlling, by a light emitter controller, the light emitter to emit the light in pulses having a pulse duration and at a pulse repetition frequency;

receiving, in a resonance chamber, acoustic waves generated in the person in response to the light emitted by the light emitter, the resonance chamber sized to form a standing wave having an acoustic wavelength of interest, when glucose analytes are in a region of the skin of the person;

sensing, by a sensor positioned side-by-side with the light emitter and facing a same direction towards the skin of the person with the light emitter, acoustic waves in the resonance chamber; and estimating, by a signal processor, the glucose concentration level in the person based on the acoustic waves sensed by the sensor, wherein the pulse duration and the pulse repetition frequency of the emitted light are set at values that support the standing wave having the acoustic wavelength of interest.

12. The method of claim 11, wherein emitting the light from the light emitter comprises emitting light having a wavelength in a mid-infrared region.

13. The method of claim 11, wherein the sensor is positioned proximate to an anti-node of the standing wave to be formed in the resonance chamber.

14. The method of claim 11, further comprising determining, by the signal processor, whether the estimated glucose concentration level falls within one of two or more pre-determined ranges.

15. The method of claim 14, further comprising transmitting, by a transmitter, a signal when the estimated glucose concentration level falls within a particular range of the two or more pre-determined ranges.

16. The method of claim 11, wherein the light emitter is a light emitting diode that emits diffuse light.

17. The method of claim 11, wherein the light emitter, the light emitter controller, the resonance chamber, the sensor, and the signal processor are enclosed in a case, and wherein the case has a length below 20 mm and a width below 20 mm.

18. The method of claim 17, wherein the case includes a case cover having an electronic transmitter incorporated therein.

19. The method of claim 11, wherein the sensor includes a microphone or a transducer.

* * * * *